United States Patent [19]

DeRees et al.

[11] Patent Number: 5,408,719
[45] Date of Patent: Apr. 25, 1995

[54] SINGLE ARM WINDSHIELD WIPER ASSEMBLY WITH A TELESCOPING WIPER BLADE

[75] Inventors: Delbert D. DeRees, Romeo; Rodolfo A. Antonelli, Troy; Robert G. Malcolm, Pontiac, all of Mich.

[73] Assignee: Chrysler Corporation, Highland Park

[21] Appl. No.: 254,737

[22] Filed: Jun. 6, 1994

[51] Int. Cl.⁶ .............................. B60S 1/36; B60S 1/34
[52] U.S. Cl. .................... 15/250.23; 15/250.24; 15/250.30; 74/20; 74/89; 74/42; 74/89.2
[58] Field of Search ............ 15/250.23, 250.21, 250.30, 15/250.35, 250.16, 250.13, 250.24, 250.25; 74/20, 89, 96, 98, 108, 89.2, 42, 43

[56] References Cited

U.S. PATENT DOCUMENTS

| | | | |
|---|---|---|---|
| 2,494,408 | 1/1950 | Rice, Jr. ........................ | 15/250.23 |
| 2,624,904 | 1/1953 | Wianco .......................... | 15/250.23 |
| 2,629,891 | 3/1953 | Green ............................ | 15/250.23 |
| 2,738,536 | 3/1956 | Spencer, Jr. ................... | 15/250.23 |
| 3,092,865 | 6/1963 | Massoud ........................ | 15/250.23 |
| 3,831,219 | 8/1974 | Deutscher et al. ............. | 15/250.21 |
| 3,831,220 | 8/1974 | Gmeiner et al. ............... | 15/250.21 |
| 4,418,440 | 12/1983 | Sigety, Jr. ...................... | 15/250.21 |
| 4,447,928 | 5/1984 | Schüch et al. ................. | 15/250.21 |
| 4,544,197 | 10/1985 | Schmidt et al. ................ | 296/85 R |
| 4,570,283 | 2/1986 | Osterday ........................ | 15/250.21 |
| 4,630,327 | 12/1986 | Schmidt et al. ................ | 15/250.21 |
| 4,639,966 | 2/1987 | Kühbauch ...................... | 15/250.23 |
| 4,641,390 | 2/1987 | Michalke ....................... | 15/250.23 |
| 4,649,590 | 3/1987 | Merkel et al. ................. | 15/250.21 |
| 4,686,733 | 8/1987 | Sahara ........................... | 15/250.16 |
| 4,707,876 | 11/1987 | Carducci ....................... | 15/250.23 |
| 4,732,048 | 3/1988 | Sakakibara et al. ........... | 74/98 |
| 4,741,067 | 4/1988 | Jambor et al. ................. | 15/250.16 |
| 4,780,926 | 11/1988 | Kondo et al. .................. | 15/250.21 |
| 4,807,325 | 2/1989 | Kühbauch ...................... | 15/250.21 |
| 4,811,451 | 3/1989 | Roller ............................ | 15/250.21 |
| 4,813,098 | 3/1989 | Kuehbauch .................... | 15/250.21 |
| 4,847,941 | 7/1989 | Kühbauch ...................... | 15/250.21 |
| 4,868,947 | 9/1989 | Sahara ........................... | 15/250.21 |

FOREIGN PATENT DOCUMENTS

| | | | |
|---|---|---|---|
| 2430163 | 1/1976 | Germany ....................... | 15/250.23 |
| 2430831 | 1/1976 | Germany ....................... | 15/250.23 |
| 87346 | 4/1988 | Japan ............................. | 15/250.23 |
| 227447 | 9/1988 | Japan ............................. | 15/250.35 |

Primary Examiner—David A. Scherbel
Assistant Examiner—Gary K. Graham
Attorney, Agent, or Firm—Christopher Taravella

[57] ABSTRACT

A single arm windshield wiper assembly including a reversible motor, a wiper pivot assembly, and a windshield wiper blade slidably connected to the wiper pivot assembly. A first actuator sub-assembly is operatively connected between the reversible motor and the wiper pivot assembly for reciprocally actuating the wiper blade. A second actuator sub-assembly is operatively connected between the reversible motor and the windshield wiper blade for telescopically moving the wiper blade.

5 Claims, 7 Drawing Sheets

SINGLE ARM WINDSHIELD WIPER ASSEMBLY WITH A TELESCOPING WIPER BLADE

TECHNICAL FIELD

This invention relates generally to vehicle windshield wiper systems and, more specifically, to a single centrally mounted wiper arm with a telescopically actuating wiper blade operatively connected thereto for wiping substantially the entire area of the windshield.

BACKGROUND ART

Heretofore, several single windshield wiper arrangements have been patented. These include Kuhbauch U.S. Pat. Nos. 4,847,941; 4,813,098; 4,807,325; and 4,639,966; Roller U.S. Pat. No. 4,811,451; Kondo et al U.S. Pat. No. 4,780,926; Jambor et al U.S. Pat. No. 4,741,067; Sakakibara et al U.S. Pat. No. 4,732,048; Carducci U.S. Pat. No. 4,707,876; Merkel et al U.S. Pat. No. 4,649,590; Michalke U.S. Pat. No. 4,641,390; Schmidt et al U.S. Pat. No. 4,630,327; Osterday U.S. Pat. No. 4,570,283; Schmidt et al U.S. Pat. No. 4,544,197; Schuch et al U.S. Pat. No. 4,447,928; Sigety U.S. Pat. No. 4,418,440; Deutscher et al U.S. Pat. No. 3,831,219; and Gmeiner et al U.S. Pat. No. 3,831,220.

A further arrangement is illustrated in a *Presta Advanced Technic Inc.* brochure entitled "Battlogg Windshield Wiper System."

Of the above, U.S. Pat. Nos. 4,847,941; 4,649,590; 4,630,327; 4,447,928; 3,831,220; and the Battlogg System disclose telescopic type arrangements, with U.S. Pat. Nos. 4,847,941 and 4,447,928 each including a crank drive; U.S. Pat. No. 4,649,590 including a four-joint-parallelogram; U.S. Pat. No. 4,630,327 including a pair of internal-toothed gear rings; and U.S. Pat. No. 3,831,220 including two pivotally connected levers between the wiper arm and a guide member.

DISCLOSURE OF THE INVENTION

A general object of the invention is to provide an improved single windshield wiper arrangement.

Another object of the invention is to provide an improved centrally mounted single windshield wiper arm having a wiper blade telescopically mounted therein.

A further object of the invention is to provide a centrally mounted single windshield wiper arm having a wiper blade telescopically mounted therein, a single reversible motor and associated dual actuator sub-assemblies adapted to both reciprocally actuate the wiper arm and telescopically actuate the wiper blade relative to the arm to, thereby, approximate the upper right and left corners of the windshield.

Still another object of the invention is to provide such an arrangement including suitable linkage members operatively connected between the motor and a wiper pivot assembly to reciprocally actuate the wiper arm; and a fixed cam with a cam follower operatively connected to the motor, and a pair of cables actuated by the follower to reciprocally operate suitable gear, sprocket and chain units serving to telescopically operate a member slidably mounted within the wiper arm and connected to the wiper blade for causing the wiper blade to traverse a path which follows the upper and side edges of the vehicle windshield.

These and other objects and advantages of the invention will become more apparent when reference is made to the following drawings and the accompanying description.

BEST MODE OF CARRYING OUT THE INVENTION

Figure 1:
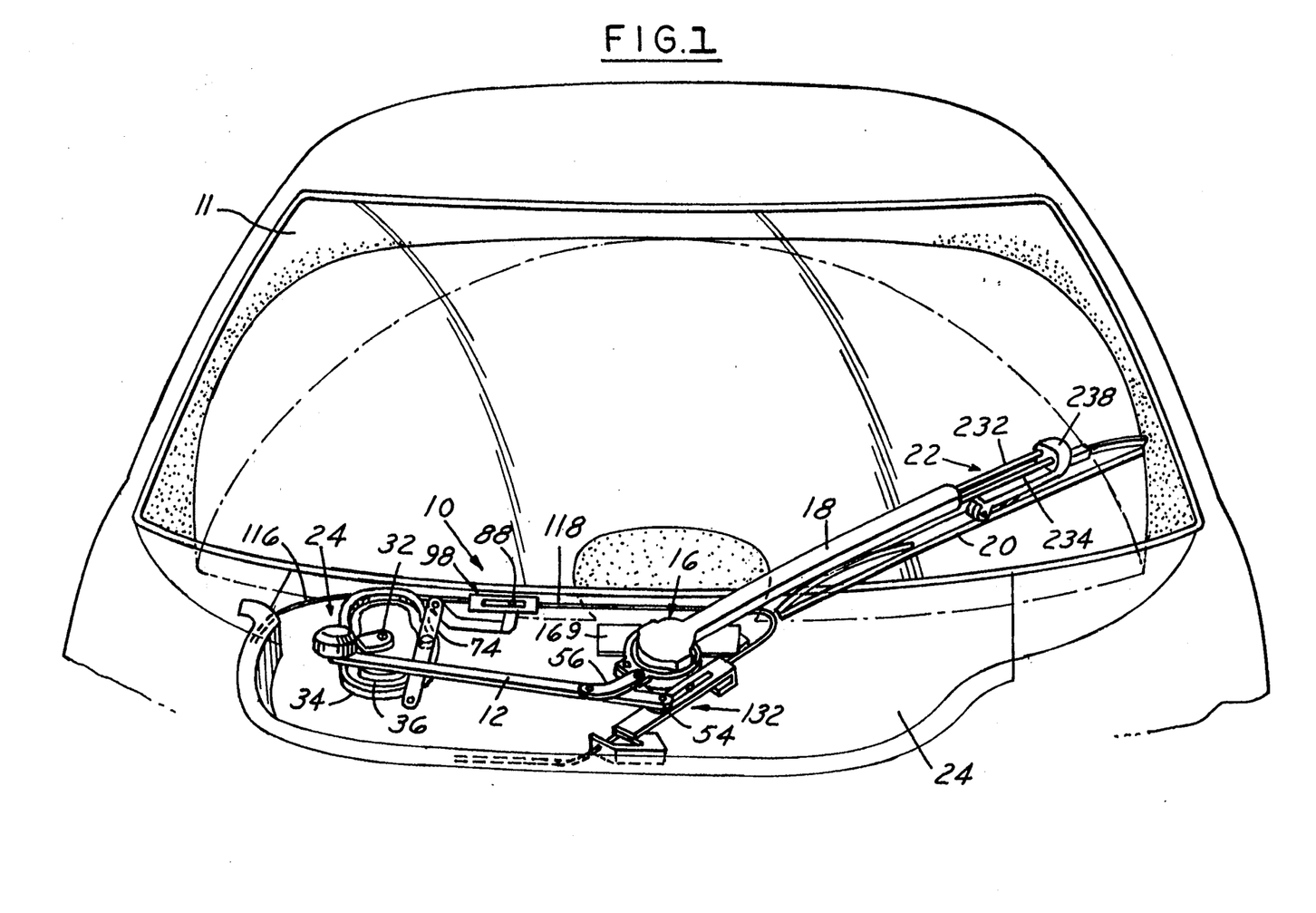
FIG. 1 is a perspective view of the inventive windshield wiper system mounted on a vehicle.
Figure 8:
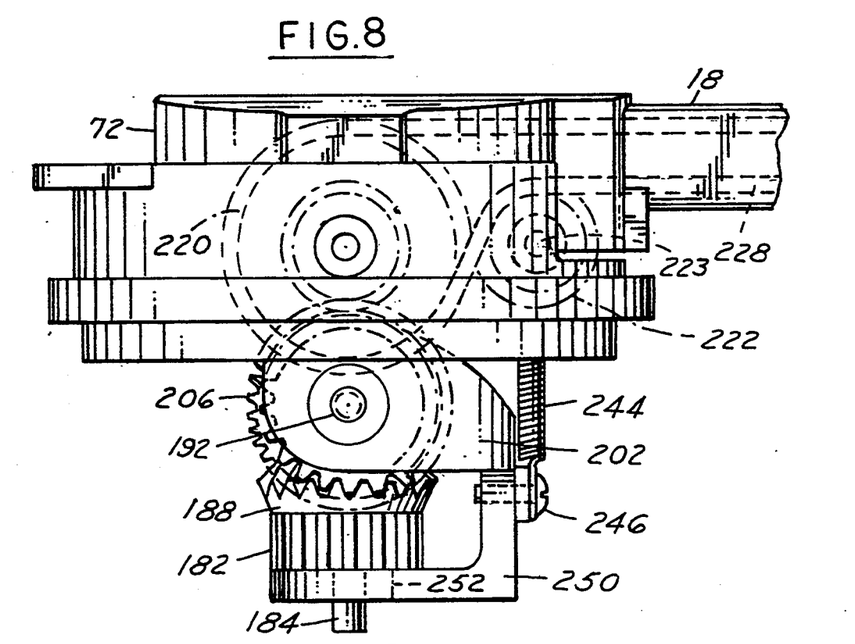
FIG. 8 is a view similar to FIG. 7 illustrating an end view of a portion of the FIG. 6 structure.
Figure 9:
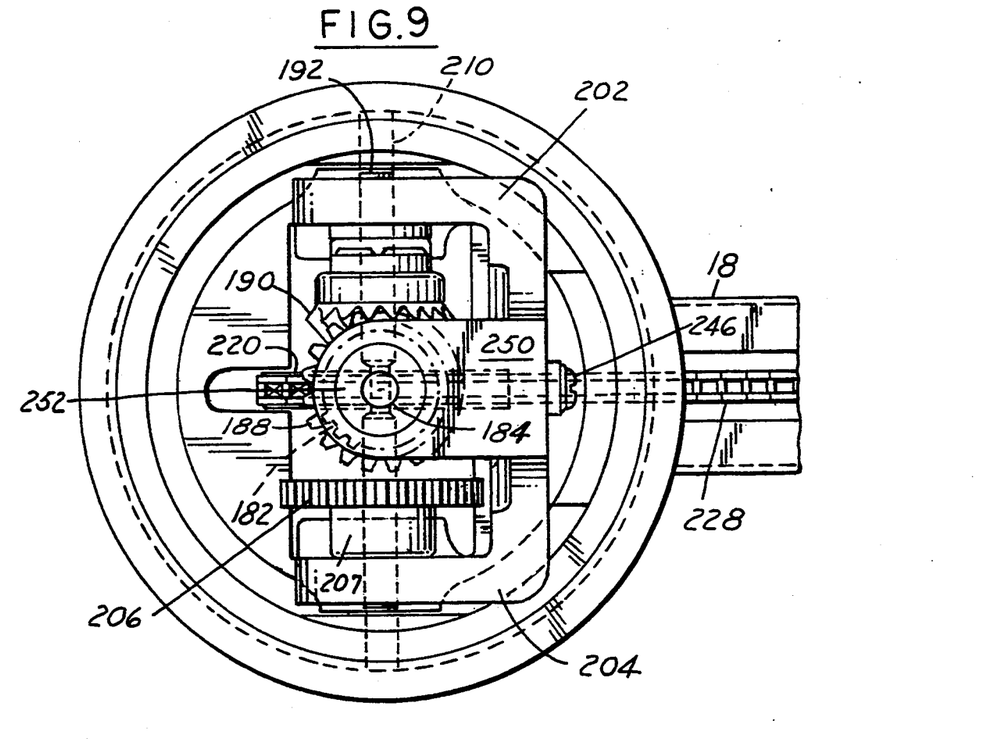
FIG. 9 is a top view of the FIG. 8 structure, with the cover thereof removed.

Referring now to the drawings in greater detail, FIG. 1 illustrates a single, wiper arm system 10 for a vehicle windshield 11. The system 10 includes, generally, a main arm 12 driven at one end thereof by a suitable reversing motor 14 (FIG. 8), and operatively connected at the other end to a center mount housing 16, as will be explained. A wiper arm 18 is operatively connected at one end thereof to the center mount housing 16. A wiper blade 20 is telescopically mounted on the other end thereof, with a suitable actuating arrangement, represented at 22, connected between the wiper blade 20 and the wiper arm 18.

Figure 3:
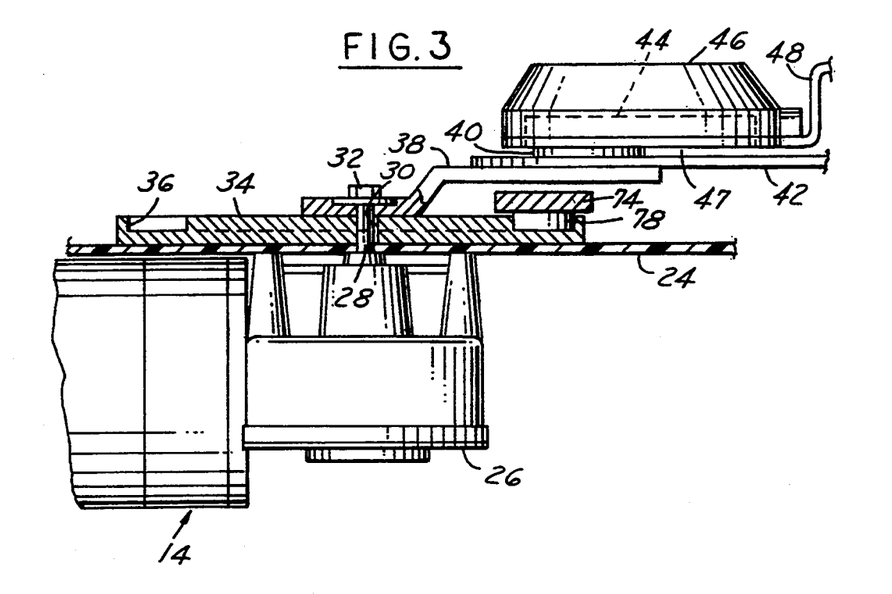
FIGS. 3 and 4 are cross-sectional views taken along the respective lines 3—3 and 4—4 of FIG. 2, and looking in the directions of the arrows.

More specifically, the system 10 includes the motor 14 (FIG. 3) mounted on one side of a vehicle cowl shelf 24, actuating a conventional right angle drive unit 26 (FIG. 3) having a shaft 28 extended through an opening 30 to the other side of the cowl shelf 26, where the end of the shaft is secured by a suitable fastener 32 to the center of a plate 34 having a predetermined cam groove 36 formed therein.

Figure 2:
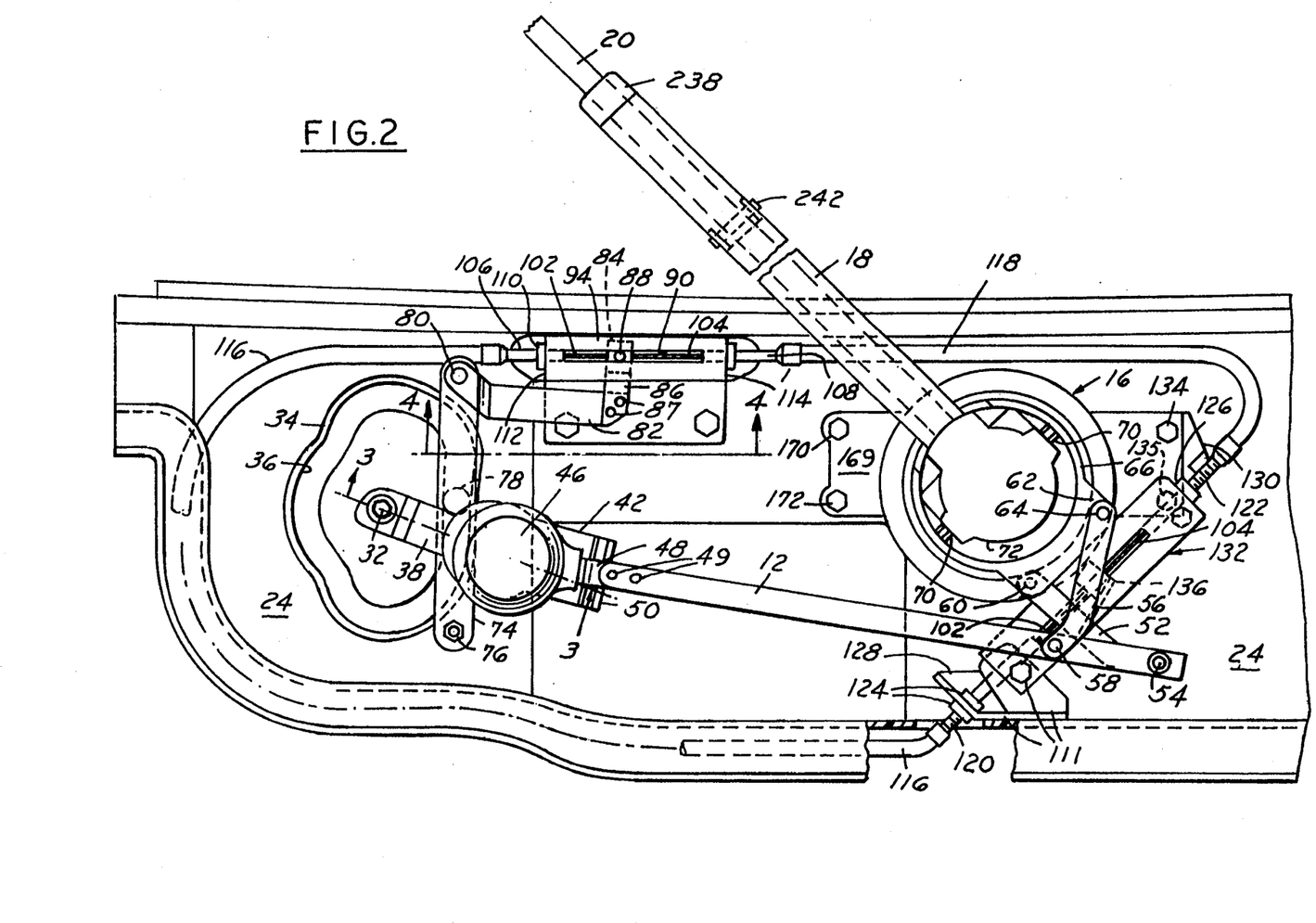
FIG. 2 is an enlarged plan view of the inventive windshield wiper system.

A short lever 38 is secured at one perforated end thereof between the fastener 32 and the plate 34 for pivotal movement with the latter. A pin 40 (FIG. 3) extends from the other end of the short lever 38 through an end portion of a further lever 42 to an edge portion of a disc 44. A cover 46 is slidably mounted around the disc 44. A washer 47 is secured to the face of the cover 46, and a bracket 48 extending from the washer 47 is secured by fasteners 49 (FIG. 2) to the leading end portion of the main arm 12. A slot 50 is formed in the other end portion of the lever 42, as a guide for the interconnected bracket 48 and main arm 12 loosely fitted through the slot. In this arrangement, rotation of the plate 34 serves to rotate the lever 38 and, thereby, move the bracket 48, during which rotation the off-center mounted disc 44 rotates within the cover 46.

A first short lever 52 is pivotally connected at one end thereof by a pivot pin 54 to the trailing end portion of the main arm 12 on one side thereof. A second short lever 56 is pivotally connected at one end thereof by a pivot pin 58 to the other side of the main arm 12 a predetermined distance from the pivot pin 54. The other end of the first lever 52 is pivotally connected by a pivot pin 60 to one side of one end of a flange 62. The other end of the second lever 56 is pivotally connected by a pivot pin 64 to the other end of the flange 62 on the opposite side thereof. The flange 62 extends from a sleeve member 66 rotatably mounted in the center mount housing 16 and connected by oppositely disposed aligned pivot pins 70 to a rounded inner end 72 of the wiper arm 18 to reciprocally pivot same, as will be explained.

Figure 4:
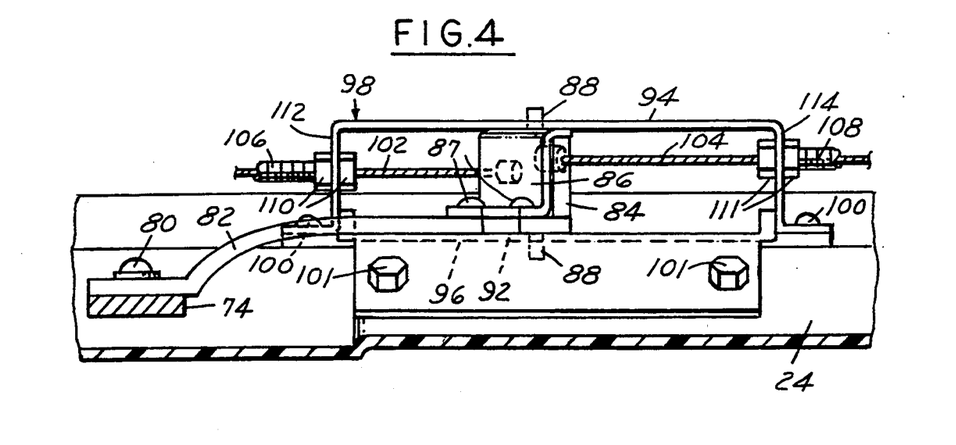

A lever 74 (FIG. 2) is pivotally mounted at one end thereof on the cowl shelf 24 by a pivot pin 76. A lug 78 is secured to the center portion of the lever 74 and seated in the cam groove 36. The other end of the lever 74 is pivotally connected by a pivot pin 80 to one end of another lever 82. The other end of the lever 82 (FIG. 4) extends beneath a cable retainer element 84. A Z-shaped bracket 86 is secured by fasteners 87 to the lever 82 so as to confine the cable retainer element 84 therebetween. Oppositely disposed aligned pins 88 extend outwardly from the bracket 86 and the lever 82. The oppositely disposed pins 88 extend into and through respective longitudinal slots 90 (FIG. 2) and 92 (FIG. 4) formed in spaced-apart walls 94 and 96 of a cable retention fixture 98 secured by fasteners 100 and 101 to the cowl shelf 24. One end of each of a pair of cables 102 and 104 is slidably mounted through respective inlet guides 106 and 108 (FIG. 4) threadedly secured by respective nuts 110 and 111 to oppositely disposed end walls 112 and 114 of the fixture 98, and secured in any suitable manner to the retainer element 84.

Figure 5:
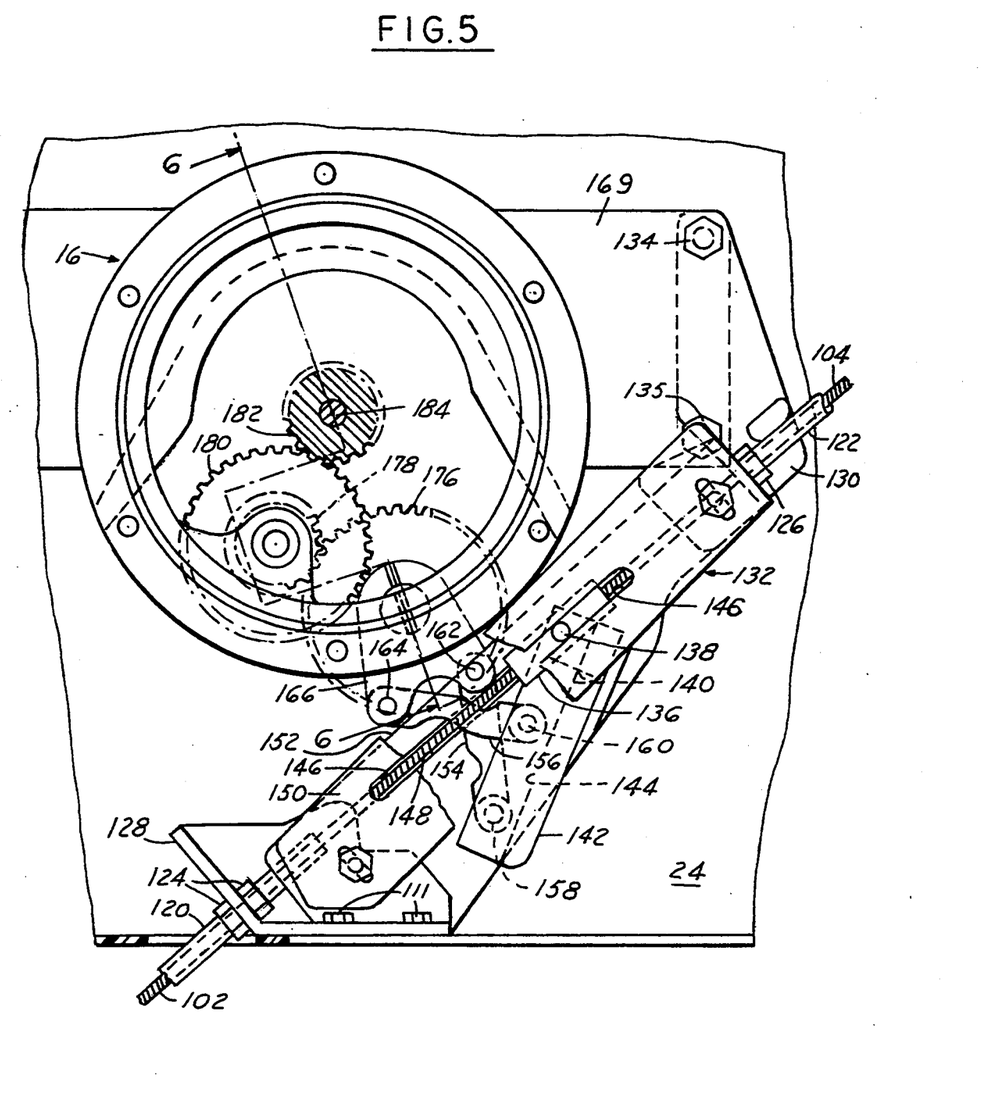
FIG. 5 is an enlarged plan view, in partial cross-section, of a portion of the FIG. 2 structure.

The cables 102 and 104 extend outwardly through the inlet guides 106 and 108 and, thence, through respective flexible plastic sheaths 116 and 118 (FIG. 2) connected to the guides. The other ends of the sheaths 116 and 118 are connected to similar respective inlet guides 120 and 122 (FIG. 5) secured by nuts 124 and 126 to respective brackets 128 and 130 forming end walls of a second cable retention fixture 132 secured by respective fasteners 134 and 135 to the cowl shelf 24. The inner ends of the respective cables 102 and 104 are secured in any suitable manner to a cable retainer element 136 (FIG. 5). The latter is pivotally mounted on a pin 138 extending between the oppositely disposed ends of a U-shaped bracket 140. The bracket 140 is secured to a link 142 having a slot 144 formed in one side thereof, for a purpose to be described. Oppositely disposed ends of the pin 138 are extended outwardly through oppositely disposed upper and lower slots 146 and 148 formed in spaced-apart walls 150 and 152 of the fixture 132.

A pair of levers 154 and 156 each have an end extended into the center slot 144 formed in the link 142, and secured by respective lower and upper pivot pins 158 and 160 therein. The levers 154 and 156 cross each other in an X configuration, and have the other ends thereof pivotally connected by respective pivot pins 162 and 164 to a lever 166 extending outwardly through a slot 168 (FIG. 6) formed in the wiper pivot assembly 16. The center mount housing 16 includes a base mounting bracket 169 (FIG. 2) secured by the above mentioned fasteners 134 and 135 and two additional fasteners 170 and 172 (FIGS. 2 and 5) to a center portion of the cowl shelf 24.

Figure 6:
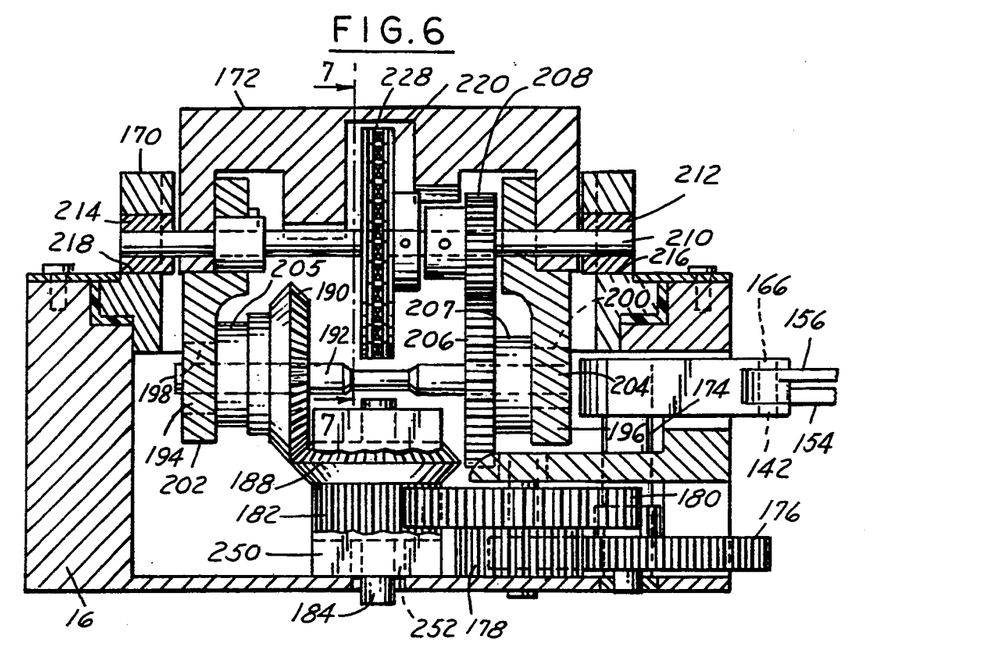
FIG. 6 is a cross-sectional view taken along the plane of the line 6—6 of FIG. 5, and looking in the direction of the arrows.

As shown in FIG. 6, within the center mount housing 16, the inner end of the lever 166 is fixedly connected to a stem 174 extending from the center of a gear 176, so as to reciprocally rotate the latter in response to reciprocal movement of the levers 154 and 156. The gear 176 meshes with a smaller diameter gear 178. The gear 178 is secured at one face thereof to the center of a larger gear 180. The gear 180 meshes, in turn, with a smaller gear 182 which is mounted on a pin 184 through the center mount housing 16 and secured at one face thereof to a bevel gear 188. The bevel gear 188 meshes with a second bevel gear 190, which is fixedly mounted on a shaft 192. The shaft 192 is rotatably mounted at its ends in bushings 194 and 196 in openings 198 and 100 formed in respective flanges 202 and 204. A spacer 205 is mounted on the shaft 192 between the flange 202 and the bevel gear 190. A gear 206 is fixedly mounted on the shaft 192 spaced apart from the bevel gear 190, with a spacer 207 mounted between the gear 206 and the flange 204. The gear 206 meshes with a smaller gear 208 fixedly mounted on a second shaft 210 extending through the flanges 202 and 204 and rotatably mounted at its ends in bushings 212 and 214 in openings 216 and 218 in the sleeve 170.

Figure 7:
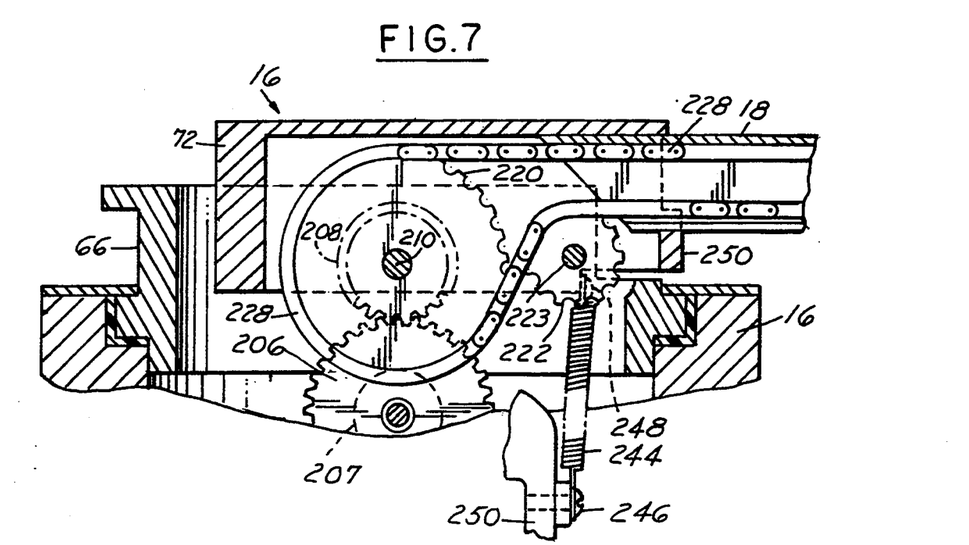
FIG. 7 is a cross-sectional view taken along the plane of the line 7—7 of FIG. 6, and looking in the direction of the arrows.

A first sprocket 220 (FIGS. 6-9) is fixedly mounted on the shaft 210 spaced apart from the gear 208. A second sprocket 222 (FIGS. 7 and 8) is mounted on a pin 223 secured to the rounded end 72, spaced apart from the first sprocket 220 on the same plane therewith.

Figures 10, 12, 13, 14, 15:
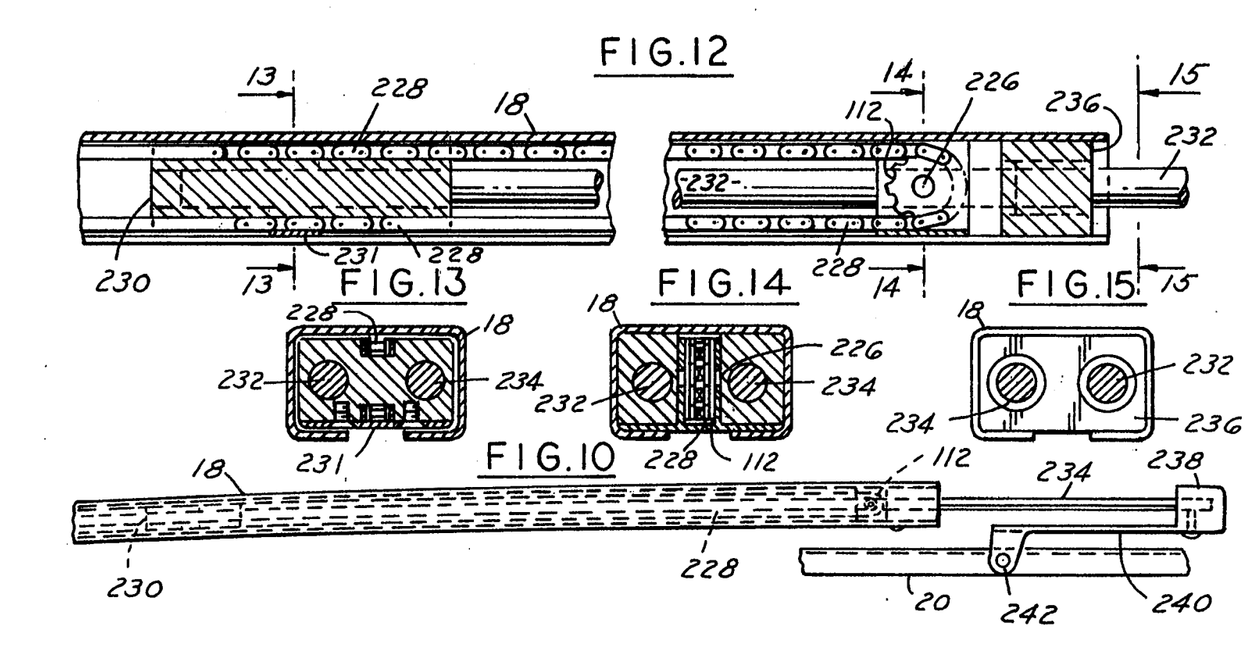
FIG. 10 is a plan view of the wiper arm portion of the FIG. 1 structure.
FIG. 12 is an enlarged cross-sectional view of a portion of the FIG. 11 structure.
FIG. 13, 14 and 15 are cross-sectional views taken along the planes of the respective lines 13—13, 14—14 and 15—15 of FIG. 12, and looking in the directions of the arrows.
Figure 11:
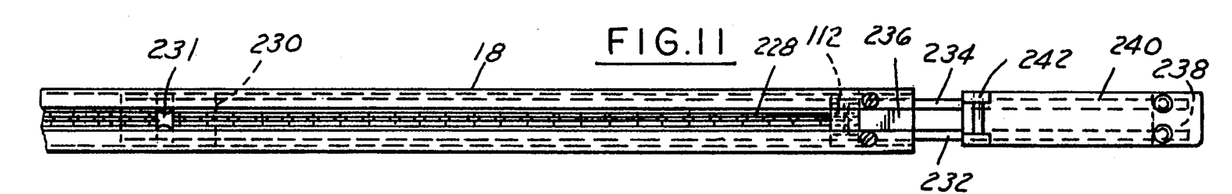
FIG. 11 is a side elevational view of the FIG. 10 wiper arm portion.

A third sprocket 224 (FIG. 12) is mounted on a pin 226 rotatably mounted in an upper portion of the wiper arm 18. A chain 228 is mounted around the three sprockets 220, 222, and 224. An abutment member 230 is secured by a suitable clamp 231 (FIG. 10) to a point on the chain within the arm 18. A pair of rods 232 and 234 (FIGS. 1 and 10-15) extend from the abutment member 230 (FIGS. 12 and 13) out through bearings 235 mounted in an end wall 236 secured in the upper end of the arm 18, on opposite sides of the chain 228.

An end cap 238 is mounted on the outer ends of the pair of rods 232 and 234. A link 240 extends from the end cap 236 to a connector 242. The wiper blade 20 is mounted at an intermediate point thereof on the connector 242.

Referring once again to FIGS. 7 and 8, there is shown a coil spring 244 connected by respective fasteners 246 and 248 between an L-shaped extension 250 of the flanges 202 and 204 and the rounded end 72 of the arm 18. The L-shaped extension has a bushing 252 (FIG. 6) mounted in a center opening thereof for receiving the pin 187.

In operation, as the reversing motor 14 reciprocally rotates the plate 34 and the associated cam groove 36, such rotation serves to actuate dual operations. These include rotation of the lever 38 and, hence, the disc 44 and the associated cover 46 and main arm 12, along with the first and second levers 52 and 56 at the far end of the arm 12. Pivoting the levers 52 and 56 results in a scissor-type action therebetween to thereby reciprocate the flange 62 and, hence, the associated sleeve member 66, rounded end 72, arm 18, and the wiper blade 20.

Concurrently, reciprocal movement of the lug 78 in the cam groove 36 pivots the levers 74 and 82, to thereby slide the pins 88 in the slots 90 and 92 to, in turn, reciprocally move the cables 102 and 104. This action moves the bracket 140 and the associated pin 138 in the slots 146 and 148 (FIG. 5), to actuate the levers 154 and 156 in response to the resultant movement of the link 142, and, thereby moves the lever 166. As may be followed in FIG. 6, movement of the lever 166 back and forth by the cables 102 and 104 reciprocally actuates the gears 176, 178, 180, 182,188,190, 206 and 208, and the sprocket 220. Such action serves to reciprocally actuate the chain 228 about the sprockets 220, 222, and 224, moving the abutment member 230 to-and-fro between the ends of the wiper arm 18 to, thereby, telescopically move the rods 232 and 234 in and out of the arm 18 to cause the wiper blade 20 to traverse a pattern across the windshield 11, determined by the movement of the lug 78 in the cam groove 36. As shown in FIG. 1, the pattern is such that the blade 20 approaches the periphery of the upper and side edges of the windshield 11. Variously shaped vehicle windshields would require various predetermined cam groove paths.

The coil spring 244 serves to pull the rounded end 72 of the wiper arm 18 inwardly about the oppositely disposed pivot pins 70, thereby serving to urge the wiper blade 20 into constant tight contact with the windshield 11.

INDUSTRIAL APPLICABILITY

It should be apparent that the invention provides a novel vehicle windshield wiper arrangement utilizing a single reversible motor and associated actuator sub-assemblies for both reciprocally operating a windshield wiper while telescopically operating same to approximate the shape of today's over-sized, slanted windshields on some vehicle models.

While but one embodiment of the invention has been shown and described, other modifications thereof are possible within the scope of the following claims.

What is claimed is:

1. Windshield wiper assembly comprising a reversible motor, a center mount housing, a sleeve member rotatably mounted in said center mount housing, a windshield wiper arm extending from said sleeve member, a wiper blade slidably mounted on said wiper arm for telescopic movement, a first actuator sub-assembly operatively connected between said reversible motor and said sleeve member for alternatively rotating said sleeve and wiper arm, and second actuator subassembly operatively connected between said reversible motor and said windshield wiper blade for telescopically moving said wiper blade, wherein said second actuator sub-assembly includes a cam connected to said reversible motor for rotation therewith, a follower actuated by said cam, a first sprocket rotatably mounted in said sleeve member, a second sprocket rotatably mounted in said wiper arm, an endless chain mounted around said sprockets, connector members operatively connected between said endless chain and said wiper blade, a plurality of gears rotatably mounted in said center mount housing for driving said first sprocket, and a cable operatively connected between said follower and one of said gears for reciprocally rotating same to, thereby, telescopically move said wiper blades in response to movement of said cam.

2. A single arm windshield wiper assembly centrally mounted on a vehicle cowl shelf having sides adjacent a windshield, said assembly comprising a reversible motor mounted on one side of said cowl shelf and having a shaft extending through the shelf, a plate having a cam groove formed therein mounted on the other side of said cowl shelf and connected to said motor shaft for rotation therewith, a center mount housing mounted on said cowl shelf, a sleeve member rotatably mounted in said center mount housing, a wiper arm secured for rotation with said sleeve member, linkage sub-assembly pivotally connected between said motor and said sleeve member for alternately rotating said sleeve member and wiper arm, a follower mounted in said cam groove, a lever pivotally mounted for reciprocal movement in said center mount housing, a pair of cables connected between said follower and said lever, a windshield wiper blade operatively connected to said wiper arm, at least one sprocket rotatably mounted in said sleeve member, a further sprocket rotatably mounted in said wiper arm, an endless chain mounted around said at least one and further sprockets, connector members operatively connected between said endless chain and said wiper blade such that said chain and said blade move in unison, and drive means operatively mounted in said center mount housing and between said at least one sprocket and said lever for telescopically moving said wiper blade in response to movement of said follower in said cam groove.

3. The single arm windshield wiper assembly described in claim 2, wherein said linkage sub-assembly comprises a first lever secured for rotation with said reversible motor, a pair of levers pivotally connected to said sleeve member and extending outwardly therefrom in an X-configuration, and an arm pivotally connected at one end thereof to said first lever, and pivotally connected at the other end thereof to said pair of levers.

4. The single arm windshield wiper assembly described in claim 2, wherein said drive means comprise a plurality of operatively intermeshing gears for driving said at least one sprocket in response to movement of said follower in said cam groove.

5. Windshield wiper assembly comprising a reversible motor, a center mount housing, a sleeve member rotatably mounted in said center mount housing, a windshield wiper arm extending from said sleeve member, a wiper blade slidably mounted on said wiper arm for telescopic movement, a first actuator sub-assembly operatively connected between said reversible motor and said sleeve member for alternatively rotating said sleeve and wiper arm, and second actuator sub-assembly operatively connected between said reversible motor and said windshield wiper blade for telescopically moving said wiper blade, wherein said second actuator sub-assembly comprises a plate secured for rotation with said reversible motor, a predetermined cam groove formed in said plate, a follower mounted in said cam groove and secured to a mid portion of a first lever, said first lever being fixedly pivotally connected at one end and movably pivotally connected at the other end to a second lever, a first cable retainer element pivotally connected to said second lever, a second cable retainer element, a pair of cables connected between said first and second cable retainer elements, a plurality of gears mounted in said center mount housing, a link pivotally connected to said second cable retainer element, a pair of levers pivotally connected to said link and crossing each other in an X-configuration to pivotally connect with a bracket, said bracket being connected to a first gear of said plurality of gears, a first sprocket mounted in said center mount housing and driven by the last of said plurality of gears, a second sprocket pivotally mounted in said wiper arm, an endless chain mounted around said sprockets, and at least one rod slidably mounted in said wiper arm and operatively connected between said chain and said wiper blade.

* * * * *